Nov. 13, 1928.
S. J. LESSING
1,691,550
VEHICLE SPRING
Filed Feb. 23, 1926
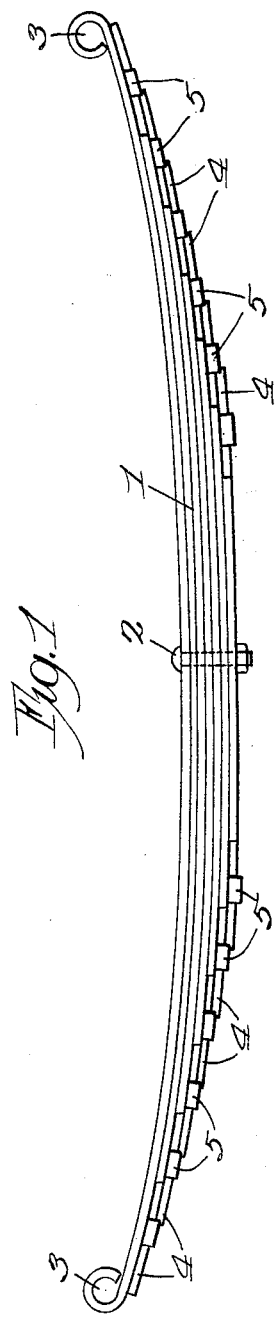
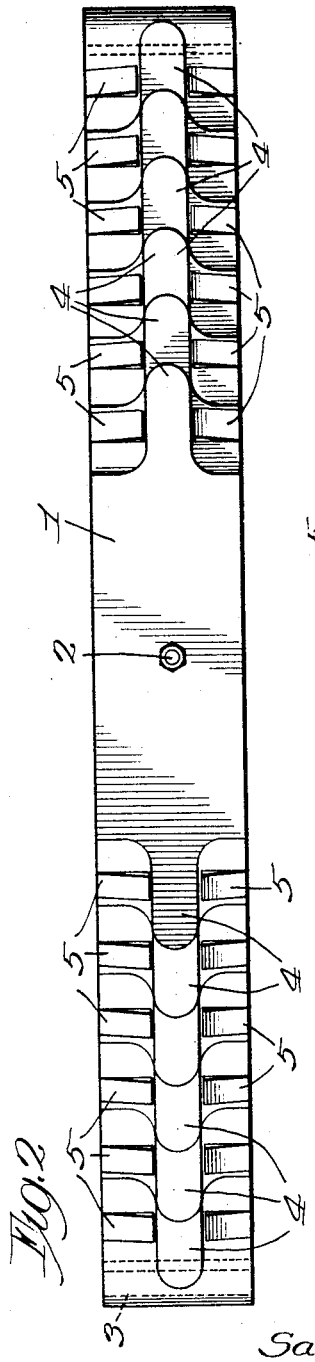
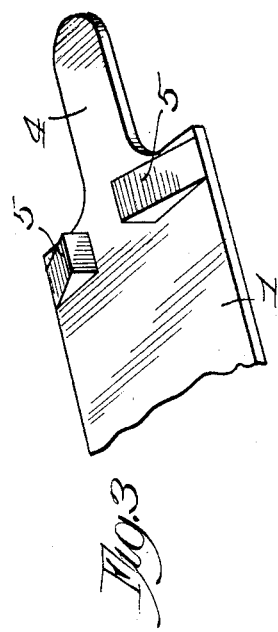
Inventor:
Samuel J. Lessing
By Arthur H. Durant
Atty.

Patented Nov. 13, 1928.

1,691,550

UNITED STATES PATENT OFFICE.

SAMUEL J. LESSING, OF ST. JOSEPH, MICHIGAN.

VEHICLE SPRING.

Application filed February 23, 1926. Serial No. 89,953.

This invention relates to leaf vehicle springs of the kind used on motor vehicles and other similar vehicles. Generally stated, the object of the invention is to provide a novel and improved construction whereby the ordinary or usual clamping means, for clamping the leaves of the spring together, thus holding them against displacement, are not necessary.

It is also an object to provide certain details and features of construction tending to increase the general efficiency and the desirability of a vehicle leaf spring of this particular character.

To these and other useful ends, the invention consists in matters hereinafter set forth and claimed and shown in the accompanying drawings, in which—

Fig. 1 is a side elevation of the vehicle leaf spring embodying the principles of the invention.

Fig. 2 is a bottom view of said spring.

Fig. 3 is a perspective of the end portion of one of the leaves of the spring.

As thus illustrated, the invention comprises a leaf spring construction having a plurality of leaves 1 connected together by a center bolt 2, the longest leaf having eye portions 3 for connection to the vehicle. Each leaf, except the longest one, has its opposite end portions provided with tongues 4, and adjacent these tongues each leaf is provided with shoulders 5 forming guides for the tongues themselves. In other words, the tongue of one leaf is held between the shoulders 5 of the next leaf, and so on throughout the series of overlapping portions of the leaves. Thus, and notwithstanding the use of only a center bolt 2, the leaves cannot skew or turn about the axis of said bolt, as they are held in place by the shoulders 5, in the manner shown. However, the leaves are free to slide, relatively to each other, when the spring is in action, the tongues 4 sliding back and forth endwise between the shoulders 5 of the different leaves. Of course, the shortest leaf does not have the shoulders 5, as it does not need them.

In this way, the use of the ordinary or usual clamps or clips for clamping the leaves together is obviated, and no such clamps or clips are necessary. Such clamps or clips are objectionable in various ways, and the invention, it will be seen, contemplates a simple and practical method of obviating the necessity of using any such clamps or clips. Any suitable means of interengagement between the leaves can be employed, to prevent lateral and edgewise displacement of the leaves, relatively to each other, but in practice the tongues 4 and the shoulders 5 serve effectively for this purpose, and the shoulders 5 may be formed integral with the leaves, or may be formed separately and fastened thereon in any suitable or desired manner. The upper and longer leaf, being held at its ends, thereby serves through the interengagement of the different leaves to hold all of the other leaves in place against displacement relatively to each other.

Thus it will be seen that the leaves are flat in cross section, so that the interengaging means do not interfere with the resiliency of the leaves, in any way. A part of one form on one leaf engages a part of a totally different form on another leaf, whereby each leaf has two kinds of engaging means. The parts 5 are of one form, and constitute one form of engaging means, while the parts 4 are of a totally different form and constitute a different form of engaging means. In other words, a part of one leaf does not engage a like part of another leaf, and the leaves are entirely flat in cross section everywhere, except where the lugs or shoulders 5 are provided, and these lugs practically do not stiffen the leaves and do not interfere with or reduce the resiliency of the leaves, and these lugs can be formed separately and welded in place, or otherwise attached to ordinary flat leaves.

It will be seen that the tongues 4 form a central row, and that the shoulders 5 form parallel rows at each side thereof, as shown in Fig. 2 of the drawings. As each leaf is practically flat in cross section throughout its length, it follows that the leaves have no formation which interferes with the flexibility thereof, each leaf being flexible throughout its length, with the exception of the small portions to which the shoulders 5 are united, but this does not interfere with the free flexing of the leaves practically for the full length of each leaf, even the tongues 4 being flexible. The leaves have flat interengagement with each other, in cross section, practically throughout the length of each leaf, and the tongues 4 have endwise movement between the shoulders 5, but are held against lateral movement, whereby the leaves are held in alinement.

Without disclaiming anything, and without prejudice to any novelty disclosed, what I claim as my invention is:

1. In leaf spring construction, the combination of a plurality of superposed leaves of different lengths having end and intermediate portions which are flat in cross section, so that the leaves engage each other flatwise in cross section, and means of interengagement between the end portions of the leaves, to hold the leaves in alinement, said means of interengagement comprising a reduced end portion forming a substantially flat tongue on the end of a leaf, and comprising opposing shoulders on the substantially flat exposed surface of the next longer leaf, disposed entirely within the width of the leaves, so that the side edges of the leaves are flush and smooth, said shoulders spaced apart a distance less than the width of the leaves and disposed in position to engage the side edges of said tongue, permitting endwise motion of said tongue between said shoulders, when the spring is flexed, but holding said tongue against lateral movement, thereby maintaining the leaves in alinement.

2. A structure as specified in claim 1, one or more of said leaves having said shoulder and tongue formation at each end thereof, the tongues being arranged in a central row and the shoulders being arranged in parallel rows at each side thereof, within the width of the leaves, the shortest leaf having said tongue formation only and the longest leaf having said shoulder formation only.

3. A structure as specified in claim 1, a plurality of the leaves having said tongue formation at each end thereof, and a plurality of the leaves having said shoulder formation for the opposite end portions thereof, the tongues of different leaves overlapping each other, the tongues forming a central row, and the shoulders forming parallel rows at each side thereof, with all said rows disposed within the width of the leaves.

Specification signed this 18th day of Feb., 1926.

SAMUEL J. LESSING.